Patented Oct. 23, 1934

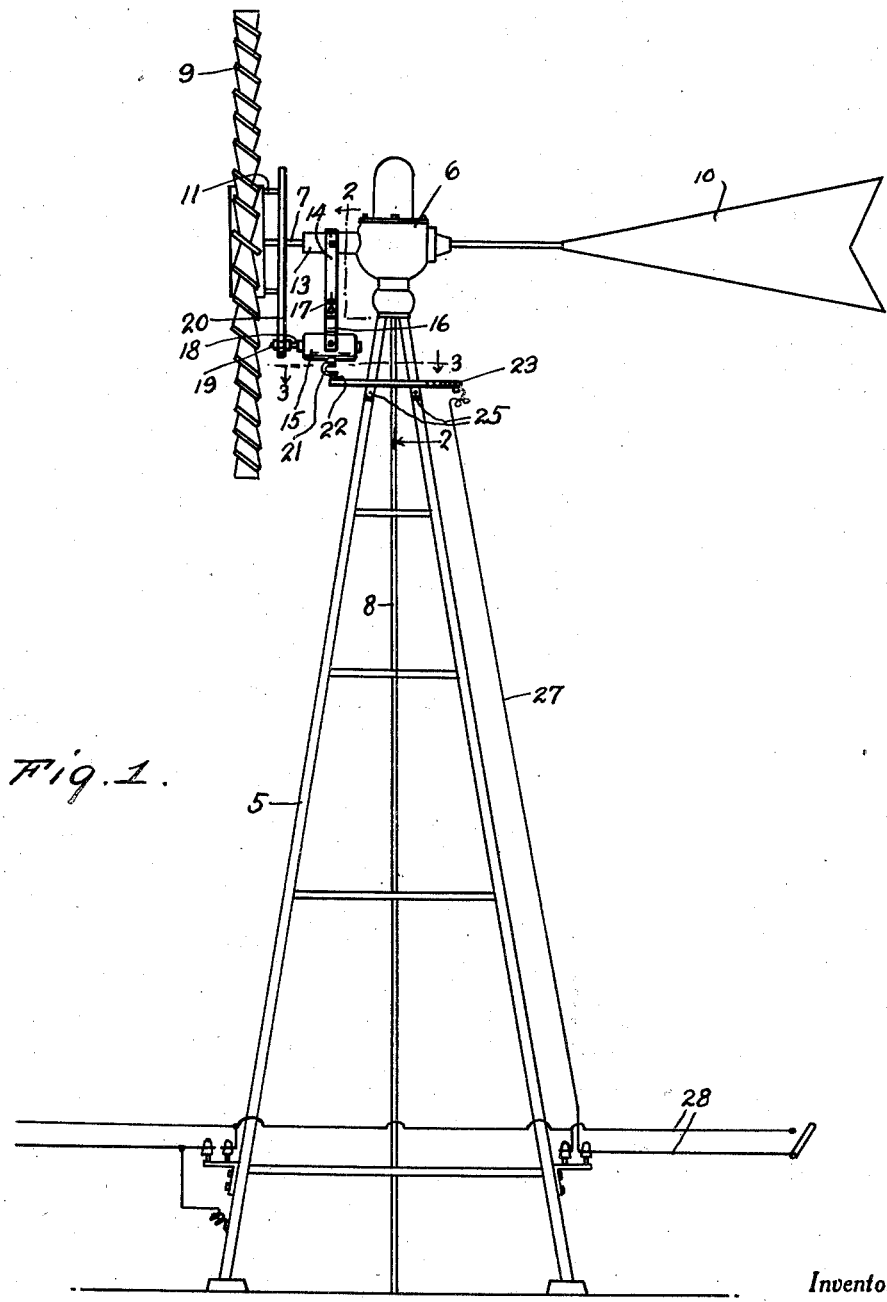

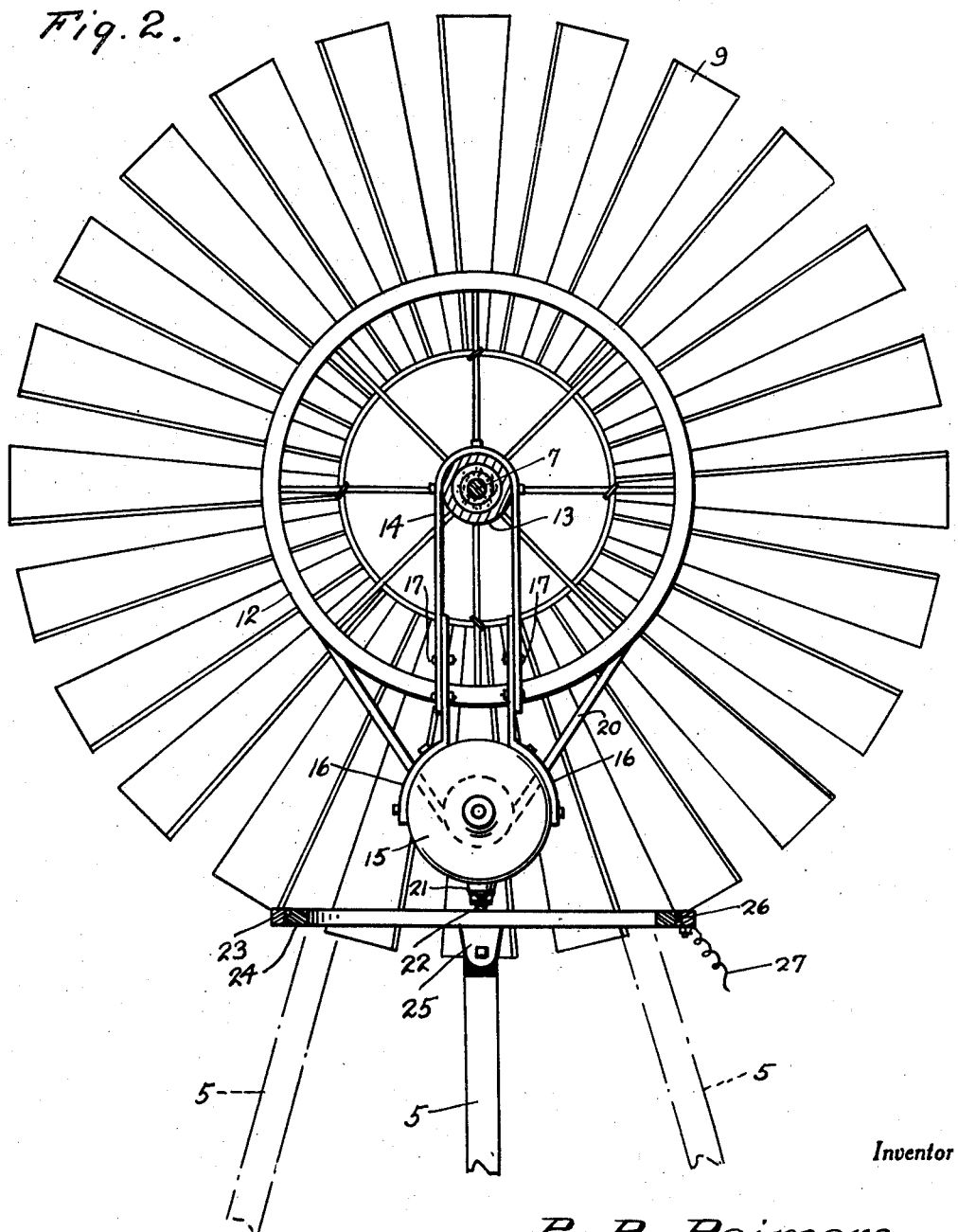

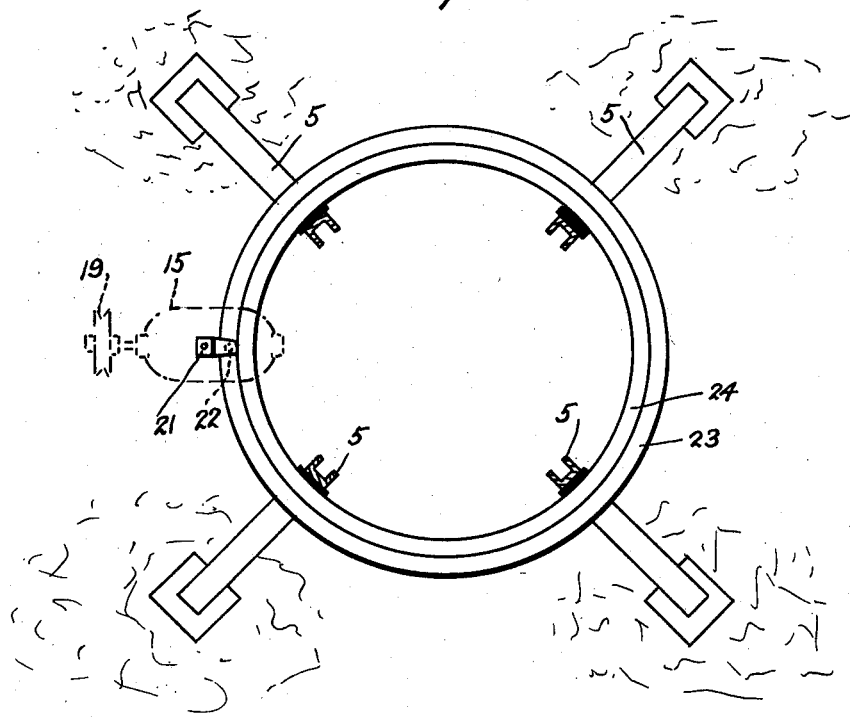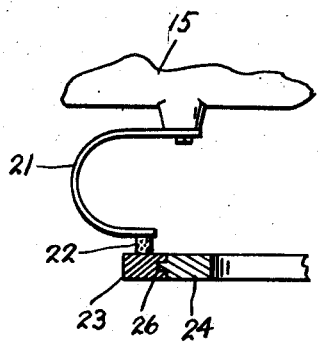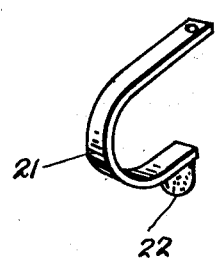

1,978,143

UNITED STATES PATENT OFFICE 1,978,143

WINDMILL DRIVEN GENERATOR

Paul Peter Reimers, Crookston, Nebr.

Application February 9, 1934, Serial No. 710,546

2 Claims. (Cl. 290—55)

This invention appertains to new and useful improvements in the art of electrical generation, and more particularly to a novel manner of mounting windmill electricity generators.

The principal object of the present invention is to provide a generator mounting of the character specified, wherein electrical connection can be made to the battery charging circuit or elsewhere, with as little leakage possible.

Still another important object of the present invention is to provide a generator mounting for windmills which will be simple in construction, of low cost to produce, and not susceptible to the development of ready defects.

These and various other important objects and advantages of the invention will become apparent to the reader of the following specification.

In the drawings:—

Figure 1 represents a side elevational view of the mounting on a windmill structure.

Figure 2 represents a vertical sectional view taken substantially on line 2—2 of Figure 1.

Figure 3 represents a sectional view taken substantially on line 3—3 of Figure 1.

Figure 4 represents a fragmentary vertical sectional view through the collector ring and showing the generator brush engaged therewith.

Figure 5 represents a perspective view of the generator brush and supporting spring.

Referring to the drawings wherein like numerals designate like parts, it can be seen in Figure 1 that numeral 5 represents the windmill tower, at the top of which is the gear box 6 into which the shaft 7 extends and is suitably geared at its inner end to the pump mechanism involving the line 8. Numeral 9 represents the usual windmill wheel suitably secured to the shaft 7, while numeral 10 represents the usual tail vane.

Secured to the back side of the wheel 9 by suitable members 11 is the pulley 12. Extending from the gear box 6 is the shaft housing 13 from which depends the U-shaped hanger 14 which, at its bight portion, is secured to the housing 13.

Numeral 15 represents the generator which has a pair of upstanding bars 16—16 secured at their lower ends to the sides thereof, while their upper ends are secured to the depending leg portions of the U-shaped hanger 14, as at 17. Thus the generator is supported in the position shown clearly in Figures 1 and 2, while the shaft 18 thereof has a pulley 19 and a belt 20 is trained over the pulley 19 and pulley 12 so that rotary motion of the wheel 9 is imparted to the generator.

In electrical connection with the output side of the generator 15 is the depending U-shaped spring 21, one leg of which is connected to the generator, while the other leg, the depending leg, carries a brush 22 for wiping engagement with the outside ring 23. Numeral 24 represents the inside ring which is stationarily secured to the tower 5 by a suitable bracket 25. A tongue and groove connection 26 is provided between the rings 23 and 24.

As is clearly shown in Figure 1, a conductor 27 extends from the outside ring 23 to connect to the charging or service lines 28.

Obviously, with this manner of supporting the generator, the generator can be applied to conventional types of windmills without altering the construction of the windmill and at small cost for the parts involved.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A windmill driven generator mount comprising a stationary ring, a ring secured to the periphery of the stationary ring by a tongue and groove connection, a generator, drive means from the windmill to the generator, a hanger for the generator, a spring connected to the output side of the generator, and a brush on the spring for engaging the outside ring.

2. In combination with a windmill having a gear housing, a windmill wheel shaft extending from the housing, a shaft extending from the gear housing and enveloping part of the shaft, a generator, a depending hanger secured to the shaft housing and attached to the generator for supporting the same, said generator being provided with a pulley, a pulley secured to the windmill wheel, and a belt trained over the said pulleys.

PAUL PETER REIMERS.